No. 649,894. Patented May 22, 1900.
C. W. ALLEN.
CURRYCOMB.
(Application filed Sept. 2, 1899.)
(No Model.)
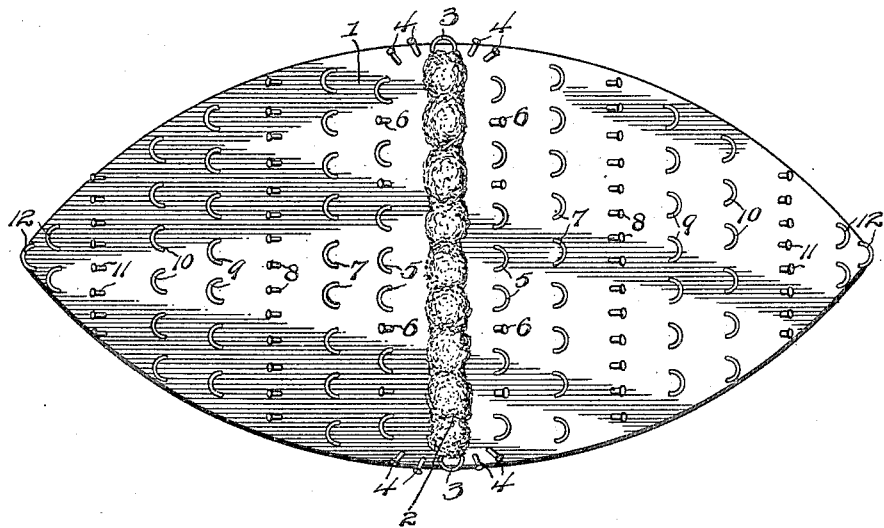
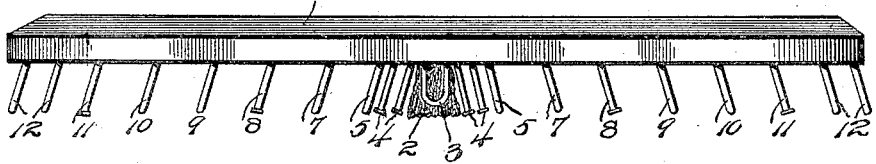
Witnesses
Ralph A. Shepard
Chas. S. Hyer
Charles W. Allen Inventor
By his Attorneys,
C A Snow & Co.
THE NORRIS PETERS CO., PHOTO-LITHO., WASHINGTON, D. C.

UNITED STATES PATENT OFFICE.

CHARLES WHITE ALLEN, OF MANASQUAN, NEW JERSEY.

CURRYCOMB.

SPECIFICATION forming part of Letters Patent No. 649,894, dated May 22, 1900.

Application filed September 2, 1899. Serial No. 729,362. (No model.)

*To all whom it may concern:*

Be it known that I, CHARLES WHITE ALLEN, a citizen of the United States, residing at Manasquan, in the county of Monmouth and State of New Jersey, have invented a new and useful Currycomb, of which the following is a specification.

This invention relates to currycombs; and the object in view is to provide an improved device of this class having a construction which is such that its use will not irritate or scratch a horse or other animal and by means of which dandruff, dry dirt, and other substances may be quickly and easily removed when the comb is used in the ordinary manner.

Other objects and advantages will appear in the subjoined description and claims, and the preferred embodiment of the invention is illustrated in the accompanying drawings, wherein corresponding parts are indicated by similar reference characters in the views, and in which—

Figure 1 is a bottom plan view of a currycomb embodying the invention. Fig. 2 is a side elevation of the same.

The numeral 1 designates a back which may be of any desired shape, but preferably of the oblong form shown, having the ends elliptical or rounded. Secured centrally and transversely of the bottom thereof is a row of tufts or brushes 2, composed of bristles or fine wire, and at opposite ends of the said row of tufts or brushes are a plurality of teeth comprising in the present instance a central loop 3, having on opposite sides blunt or headed teeth 4. These teeth stand outwardly and afford means for working the comb in close places on the body of the animal or in small hollows. From the central row of tufts or brushes the remaining teeth on opposite sides are of similar character and correspondingly arranged, and next to the said brushes is a transverse row of looped teeth 5, intersected in part by blunt straight teeth 6. The next transverse row of teeth is composed entirely of loops 7 and followed by a parallel row of straight blunt teeth 8. Next to the teeth 8 are two rows of looped teeth 9 and 10, and following these is another continuous row of straight blunt teeth 11, the series of teeth terminating at the outer end in three looped teeth 12, disposed triangularly or so that the regular space between the rows of teeth may be consistently carried out. The rows of teeth on opposite sides of the brushes slant in opposite directions or so that the comb may be effectively used for currying at opposite ends and when worked with this purpose in view. When running the comb over the hair, the teeth slant in the direction in which a forward movement is made, loosen up the dirt, dandruff, or other substance, and the following teeth at the opposite end drag over the hair and similarly operate on a return movement, the brushes acting at the same time and cleaning out the loose material, thus affording a double action or a simultaneous currying and brushing.

The looped teeth not only clean as they move over the hair, but also raise the latter for the more thorough operation of the blunt teeth, and by the use of such teeth the skin of the animal will be protected from abrasion or scratching. The opposite ends of the brush may also be conveniently employed for currying the limbs of the animal, as well as the teeth at the opposite ends of the row of brushes.

The alternate arrangement of the looped teeth and the single straight blunt teeth is exceptionally effective in view of the fact, as before indicated, that the looped teeth raise the hair for the immediate subsequent loosening action of the straight blunt teeth, and, furthermore, the looped teeth drag out the dirt, dandruff, or other substance after such loosening by the blunt teeth. This operation ensues without danger of injury to the skin of the animal and the pressure on the comb does not have to be regulated, as in the ordinary form of currycomb having sharp teeth. A material advantage is gained by having all the teeth open or provided with spaces between them in both transverse and longitudinal directions, for the reason that the hair is permitted to pass easily between the teeth and the latter individually act to loosen the dirt, dandruff, or other substance. The comb constructed in accordance with the improvement may also be moved in transverse directions as well as other directions with a beneficial result, arising from the individuality of the teeth and in contradistinction to bars or strips forming or having formed thereon teeth of various designs. It is obvious that a series of bars with unbroken or untoothed working edges are not effective for cleaning purposes except when moved in directions at an angle to their position on the comb-back, and this is also true of combs having strips with toothed or serrated edges. The single central brush 2 is also an important feature in that the one brush serves its function in conjunction with either series of teeth on opposite sides of the same.

The number of the brushes might be increased and the teeth varied and made longer or shorter, and, furthermore, changes in the proportions, size, and minor details of construction could be resorted to without departing from the scope or sacrificing any of the advantages of the invention.

Having thus described the invention, what is claimed as new is—

1. In a currycomb, the combination of a back having a central transverse stationary brush on the bottom, and transverse rows or lines of teeth at opposite sides of the brush, the rows of teeth being transversely and longitudinally separated to preserve their individuality and all similarly slanted their full length outwardly toward the ends of the back in reverse directions on opposite sides of said brush and composed of straight and looped teeth.

2. In a currycomb, the combination of a back, a central transverse line of stationary brushes on the body of the back, and transverse rows of individual mixed teeth on opposite sides of the brushes and between the latter and the opposite ends of the back and composed of single-wire and looped teeth with spaces between them in transverse and longitudinal directions, the teeth at opposite sides of the brushes being similarly arranged and all the teeth of the two sets of teeth inclined their full length outwardly in reverse directions and away from the brushes, the teeth of each set being all similarly inclined.

3. In a currycomb, the combination of a back, a central line of stationary brushes on the bottom of the back, lines of rigid wire teeth extending transversely across the back and comprising distinct rows of single-wire and looped teeth arranged individually and with spaces between them both in transverse and longitudinal directions, completely to the said back, the central line of brushes dividing the teeth into two distinct sets, all the teeth of each set being straight and inclined their full length reversely to all the teeth of the other set, and the teeth of each set inclined similarly outwardly toward the ends of the back.

4. In a currycomb, the combination of a central line of stationary brushes extending transversely across the bottom thereof, and outwardly-inclined side teeth around the opposite terminals of the line of brushes, the said teeth being of individual form and all equally inclined.

5. In a currycomb, the combination of a back, lines of straight looped wire teeth extending transversely thereof and intersected by parallel lines of straight single-wire teeth, and other lines of teeth composed of alternately-arranged single-wire and looped teeth also extending transversely of the back, spaces being formed between all the teeth both in transverse and longitudinal directions, the teeth being centrally separated to form two distinct sets, the teeth of each set being all inclined similarly in an outward direction toward the opposite ends of the back and each tooth inclined its full length in the direction of its set.

In testimony that I claim the foregoing as my own I have hereto affixed my signature in the presence of two witnesses.

CHARLES WHITE ALLEN.

Witnesses:
GEO. D. DAVISON,
JOHN I. BAILEY.